United States Patent
Johnston et al.

(10) Patent No.: US 10,339,468 B1
(45) Date of Patent: Jul. 2, 2019

(54) CURATING TRAINING DATA FOR INCREMENTAL RE-TRAINING OF A PREDICTIVE MODEL

(71) Applicant: Groupon, Inc., Chicago, IL (US)

(72) Inventors: David Alan Johnston, Portola Valley, CA (US); Shawn Ryan Jeffery, Burlingame, CA (US); Vasileios Polychronopoulos, Sana Cruz, CA (US)

(73) Assignee: GROUPON, INC., Chicago, IL (US)

( * ) Notice: Subject to any disclaimer, the term of this patent is extended or adjusted under 35 U.S.C. 154(b) by 642 days.

(21) Appl. No.: 14/918,362

(22) Filed: Oct. 20, 2015

Related U.S. Application Data

(60) Provisional application No. 62/069,692, filed on Oct. 28, 2014.

(51) Int. Cl.
G06N 5/04 (2006.01)
G06N 20/00 (2019.01)

(52) U.S. Cl.
CPC ............. *G06N 20/00* (2019.01); *G06N 5/04* (2013.01)

(58) Field of Classification Search
USPC .......................................................... 706/12
See application file for complete search history.

(56) References Cited

U.S. PATENT DOCUMENTS

| | | |
|---|---|---|
| 5,825,646 A | 10/1998 | Keeler et al. |
| 5,826,249 A | 10/1998 | Skeirik |
| 6,092,072 A | 7/2000 | Guha et al. |
| 7,418,431 B1 | 8/2008 | Nies et al. |
| 7,480,640 B1 * | 1/2009 | Elad ....................... G06Q 10/10 706/14 |
| 7,512,582 B2 | 3/2009 | Cao et al. |
| 7,925,620 B1 | 4/2011 | Yoon |
| 8,402,543 B1 * | 3/2013 | Ranjan ................ H04L 63/1416 709/223 |
| 8,620,842 B1 | 12/2013 | Cormack |
| 8,843,427 B1 | 9/2014 | Lin et al. |
| 9,390,112 B1 | 7/2016 | Daly et al. |
| 2003/0130899 A1 | 7/2003 | Ferguson et al. |
| 2003/0236691 A1 * | 12/2003 | Casatl .............. G06Q 10/06312 705/7.27 |
| 2004/0049473 A1 | 3/2004 | Gower et al. |
| 2004/0205482 A1 | 10/2004 | Basu et al. |
| 2005/0049990 A1 | 3/2005 | Milenova et al. |

(Continued)

OTHER PUBLICATIONS

ACM Digital Library Beyond myopic inference in big data pipelines, Karthik Raman, Adith Swaminathan, Johannes Gehrke, Thorsten Joachims, Proceeding KDD '13 Proceedings of the 19th ACM SIGKDD international conference on Knowledge discovery and data mining pp. 86-94 Aug. 11-14, 2013.*

(Continued)

*Primary Examiner* — Michael B Holmes
(74) *Attorney, Agent, or Firm* — Alston & Bird LLP

(57) ABSTRACT

In general, embodiments of the present invention provide systems, methods and computer readable media for curating a training data set to ensure that training data being updated continuously from a data reservoir of verified possible training examples remain an accurate, high-quality representation of the distribution of data that are being input to a predictive model for processing.

36 Claims, 4 Drawing Sheets

(56) References Cited

U.S. PATENT DOCUMENTS

| | | |
|---|---|---|
| 2006/0259197 A1 | 11/2006 | Boe et al. |
| 2007/0282766 A1 | 12/2007 | Hartman et al. |
| 2008/0147574 A1 | 6/2008 | Chidlovskii |
| 2009/0119268 A1 | 5/2009 | Bandaru et al. |
| 2009/0193328 A1 | 7/2009 | Eis et al. |
| 2011/0191335 A1 | 8/2011 | Miller et al. |
| 2011/0313977 A1 | 12/2011 | Al-Kateb et al. |
| 2012/0054184 A1 | 3/2012 | Masud et al. |
| 2012/0054226 A1 | 3/2012 | Cao et al. |
| 2012/0254186 A1 | 10/2012 | Winner et al. |
| 2012/0284213 A1 | 11/2012 | Lin et al. |
| 2013/0198119 A1 | 8/2013 | Eberhardt et al. |
| 2013/0246315 A1 | 9/2013 | Joshi et al. |
| 2013/0279795 A1 | 10/2013 | Shlain et al. |
| 2014/0101544 A1 | 4/2014 | Albrecht et al. |
| 2014/0129261 A1 | 5/2014 | Bothwell et al. |
| 2014/0172767 A1 | 6/2014 | Chen et al. |
| 2014/0279716 A1 | 9/2014 | Cormack et al. |
| 2014/0279745 A1 | 9/2014 | Esponda et al. |
| 2014/0297570 A1 | 10/2014 | Garera et al. |
| 2015/0161386 A1 | 6/2015 | Gupta et al. |
| 2015/0356451 A1 | 12/2015 | Gupta et al. |
| 2016/0034809 A1 | 2/2016 | Trenholm et al. |
| 2016/0071023 A1 | 3/2016 | Eicher et al. |

OTHER PUBLICATIONS

Transfer Learning by Finetuning Pretrained CNNs Entirely with Synthetic Images, Param Rajpural Alakh Aggarwal, Manik Goyal, Sanchit Gupta , Jonti Talukdar, Hristo Bojinov, and Ravi Hegde Indian Institute of Technology Gandhinagar, Gandhinagar 382355, India 2018 pp. 517-528.*

ACM Digital Library a Review of User Interface Design for Interactive Machine Learning, John J. Dudley & Per Ola Kristensson, Journal ACM Transactions on Interactive Intelligent Systems (TiiS)—Special Issue on Human-Centered Machine Learning archive vol. 8 Issue 2, Jul. 2018, pp. 1-37.*

U.S. Appl. No. 14/817,005, filed Aug. 3, 2015.
U.S. Appl. No. 14/578,210, filed Dec. 19, 2014.
U.S. Appl. No. 14/578,205, filed Dec. 19, 2014.
U.S. Appl. No. 14/578,200, filed Dec. 19, 2014.
U.S. Appl. No. 14/578,192, filed Dec. 19, 2014.

Tong, et al., "Support Vector Machine Active Learning with Applications to Text Classification," Journal of Machine Learning Research, pp. 45-66, (2001).

Settles, "Active Learning Literature Survey," Computer Sciences Technical Report 1648, University of Wisconsin—Madison, 52.55-56 (2010): 11.

Settles, "Active Learning Literature Survey," Computer Sciences Technical Report 1648, University of Wisconsin—Madison, (2009).

Brinker, "Incorporating Diversity in Active Learning with Support Vector Machines," Proceedings of the Twentieth International Conference on Machine Learning (ICML—2003), (2003).

Basu, et al., "Active Semi-Supervision for Pairwise Constrained Clustering," Proceedings of the SIAM International Conference on Data Mining (SDM—2004), Society for Industrial and Applied Mathematics, pp. 333-344, (2004).

U.S. Appl. No. 61/920,251, filed Dec. 23, 2013.
U.S. Appl. No. 14/038,661, filed Sep. 16, 2013.

Settles, "Active Learning Literature Survey," Computer Sciences Technical Report 1648, University of Wisconsin—Madison, pp. 1-67, (Jan. 26, 2010).

Whang et al.—"Entity Resolution with Iterative Blocking"—2009—https://dl.acm.org/citation.cfm7icM559870 (Year: 2009) 219-231.

North, H. et al., "Classifying agricultural land uses with time series of satellite images," 2012 IEEE Inti. Geoscience and Remote Sensing Symp. (IGARSS 2012) pp. 5693-5696.

Mao, C.-H. et al., "Semi-supervised Co-training and Active Learning based Approach for Multi-view Intrusion Detection," Proc. of the 2009 ACM Symp. on Applied Computing (2009) pp. 2042-2048.

Kayacik, H. et al., "Selecting features for intrusion detection: A feature relevance analysis on KDD 99 intrusion detection datasets," Proc. of the 3rd Annual Cont on Privacy, Security, and Trust (2005) 6 pp.

Javani, M. et al., "Clustering and feature selection via PSO algorithm," 2011 Inti. Symp. on Artificial Intelligence and Signal Processing (AISP 2011) pp. 71-76.

Lewis, D. et al., "RCV1: A new benchmark collection for Text Categorization Research" Journal of Machine Learning Research, vol. 5 (2004) pp. 361-397. (Year: 2004).

Joshi, A. et al., "Mutli-class active learning for image classification," Mitsubishi Electric Research Laboratories Technical Report TR-2009-034 (2009) 10 pp. (Year: 2009).

Dredze, M. et al., "Confidence-weighted linear classification," Proc. of the 25th Inti. Conf. on Machine Learning (2008) 8 pp. (Year: 2008).

Dredze, M. et al., "Active learning with confidence," Proc. of ACL-08:HTL, Short Papers (2008) pp. 233-236. (Year: 2008).

* cited by examiner

CURATING TRAINING DATA FOR INCREMENTAL RE-TRAINING OF A PREDICTIVE MODEL

CROSS-REFERENCE TO RELATED APPLICATIONS

This application claims the benefit of U.S. Provisional Application No. 62/069,692, entitled "CURATING TRAINING DATA FOR INCREMENTAL RE-TRAINING OF A PREDICTIVE MODEL," and filed Oct. 28, 2014, of which the entire contents are hereby incorporated by reference.

FIELD

Embodiments of the invention relate, generally, to curating training data used for incremental re-training of a predictive model via supervised learning.

BACKGROUND

Current methods for increasing the likelihood of successful incremental re-training of a predictive model exhibit a plurality of problems that make current systems insufficient, ineffective and/or the like. Through applied effort, ingenuity, and innovation, solutions to improve such methods have been realized and are described in connection with embodiments of the present invention.

SUMMARY

Data being continuously sampled from a data stream is an example of dynamic data. Analysis of such dynamic data typically is based on data-driven statistical models that can be generated using machine learning. The statistical distribution of the set of training data instances used to derive a predictive model using supervised learning should be an accurate representation of the distribution of unlabeled data that will be input to the model for processing. Additionally, the composition of a training data set should be structured to provide as much information as possible to the model. However, dynamic data is inherently inconsistent. Data quality fluctuations may affect the performance of a statistical model, and, in some cases when the data quality and/or statistical distribution of the data has changed over time, the statistical model may have to be replaced by a different model that more closely fits the changed data.

Obtaining a set of accurately distributed, high-quality training data instances for derivation of a model is difficult, time-consuming, and/or expensive. Once a model has been derived from an initial training data set, being able to perform real time monitoring of the performance of the model as well as to perform data quality assessments on dynamic data as it is being collected can enable the model to be adapted incrementally to fluctuations of quality and/or statistical distribution of dynamic data, thus reducing the cost involved in repeatedly replacing the model.

In general, embodiments of the present invention provide herein systems, methods and computer readable media for curating a training data set to ensure that training data being updated continuously from a data reservoir of verified possible training examples remain an accurate, high-quality representation of the distribution of data that are being input to a predictive model for processing. A curated training data set thus will ensure a high probability of success for adaptive incremental re-training of the model to improve model performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
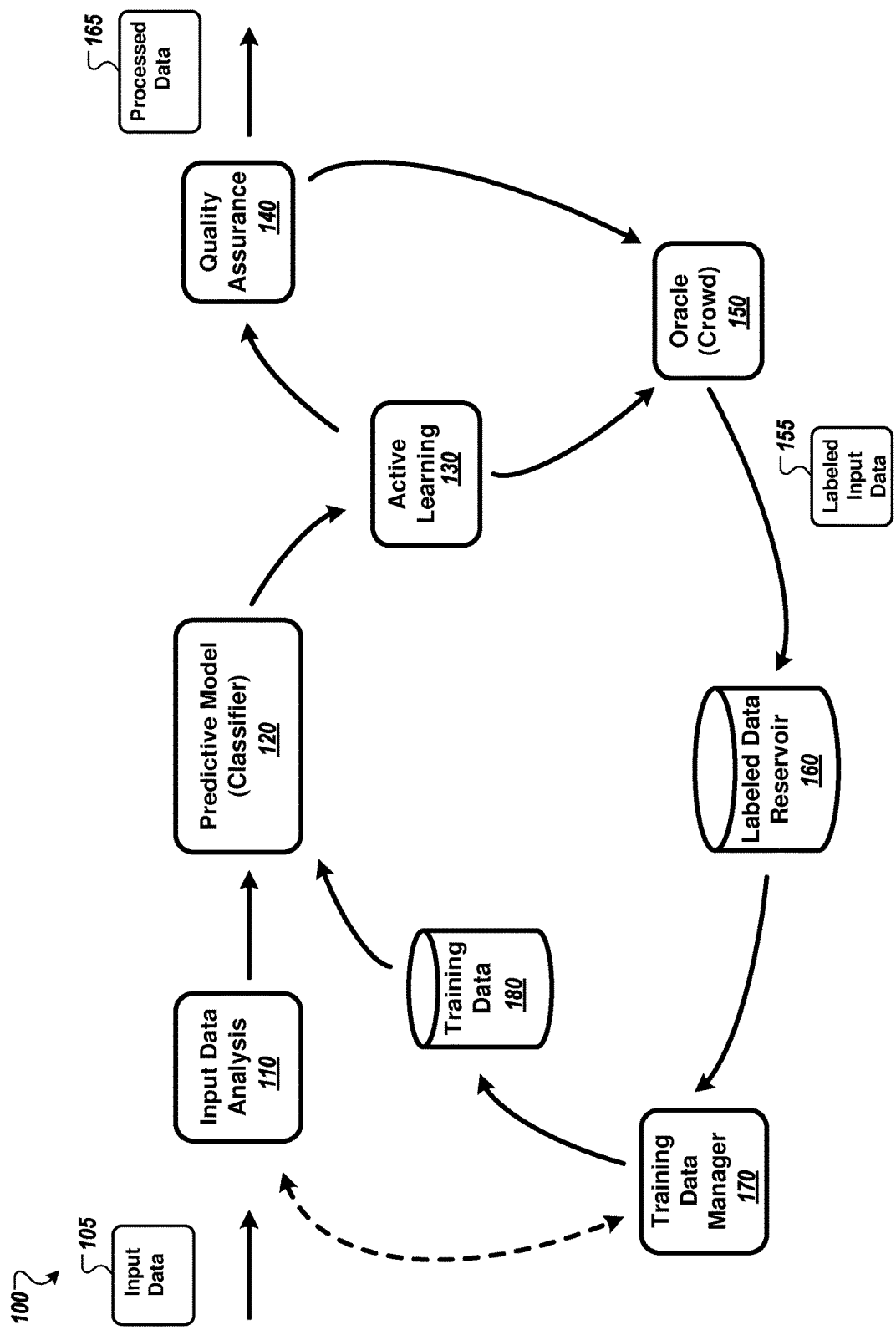
FIG. 1 illustrates an example system configured to implement an adaptive crowd-trained learning framework that includes a curated training data set that is adapted for accurate representation of dynamic data analysis in accordance with some embodiments discussed herein.

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

Data being continuously sampled from a data stream is an example of dynamic data. In some embodiments, the data stream may be generated from a data store while, in some alternative embodiments, the data stream may represent data collected from a variety of online sources (e.g., websites, blogs, and social media). Analysis of such dynamic data typically is based on data-driven statistical models that can be generated using machine learning. One type of machine learning is supervised learning, in which a statistical predictive model is derived based on a training data set of examples representing a particular modeling task to be performed by the model. An exemplary particular task may be a binary classification task in which the predictive model (a binary classifier) returns a judgment as to which of two categories an input data instance most likely belongs. Using supervised learning, the binary classifier is derived based on a set of labeled training data consisting of data instances, each instance being associated with a verified label identifying the category to which the instance belongs. Typically, the labels associated with the training data set of examples have been verified by at least one reliable source of truth (an oracle, hereinafter) to ensure their accuracy. For example, in embodiments, an oracle may be a crowd, a flat file of data verification results previously received from one or more oracles, and/or data verification software.

The statistical distribution of the set of training data instances should be an accurate representation of the distribution of unlabeled data that will be input to the model for processing. Additionally, the composition of a training data set should be structured to provide as much information as possible to the model being derived. Obtaining a set of accurately distributed, high-quality training data instances (i.e., examples that are non-obvious or edge cases that could improve model performance through training) for derivation of a model is difficult, time-consuming, and/or expensive. For example, a training data set for a classification task should be balanced to ensure that examples of one category are not more frequent within the training data set than examples of the other categories, but assembling this distribution may be difficult if the frequency of one of the categories in a general data population is relatively rare. In a second example, derivation of a de-duplication classifier (i.e., a classifier that detects duplicates) using supervised learning requires a training data set that includes examples of duplicates as well as examples of non-duplicates, and obtaining enough high-quality examples of duplicates from a general population is particularly difficult.

Dynamic data is inherently inconsistent. The quality of the data sources may vary, the quality of the data collection methods may vary, and, in the case of data being collected continuously from a data stream, the overall quality and statistical distribution of the data itself may vary over time. Data quality fluctuations may affect the performance of a statistical model, and, in some cases when the data quality and/or statistical distribution of the data has changed over time, the performance of a statistical model may degrade so that the current model may have to be replaced by a different model that more closely fits the changed data. Once a model has been derived from an initial training data set, being able to perform real time monitoring of the performance of the model as well as to perform data quality assessments on dynamic data as it is being collected can enable an instantiated model to be adapted incrementally to fluctuations of quality and/or statistical distribution of dynamic data, thus reducing the cost involved in repeatedly replacing the model.

As such, and according to some example embodiments, the systems and methods described herein are therefore configured to curate a training data set to ensure that training data being updated continuously from a data reservoir of verified possible training examples remain an accurate, high-quality representation of the distribution of data that are being input to a predictive model for processing. Thus, as the training data are being adapted to fluctuations in quality and composition of the dynamic data being processed, the incremental re-training of a predictive model using a curated training data set will ensure a high probability of success in improving the model performance.

An adaptive crowd-trained learning framework for automatically building and maintaining a predictive statistical model may be used to perform analysis of dynamic data. An exemplary adaptive crowd-trained framework is described in U.S. Provisional Patent Application No. 61/920,251, entitled "Processing Dynamic Data Using An Adaptive Crowd-Trained Learning System," filed on Dec. 23, 2013, and which is incorporated herein in its entirety.

Once a predictive model is trained using an initial training data set, the framework monitors the performance of the model as new input data are processed and leverages active learning and an oracle to generate feedback about the changing data. Based on the feedback, current examples of the input data being processed are selected to be given true labels by the oracle. The resulting verified examples may be stored in a data reservoir, and the training data set used to derive the model may be updated continuously using these stored high-quality examples. In embodiments, the training data set is curated to ensure that incremental re-training of the model using training data that are updated from the data reservoir will ensure a high probability of success in improving the model performance.

For clarity, the inventions will be described for embodiments in which curating training data for incremental re-training of a predictive model is included within an adaptive crowd-trained learning framework. However, it is to be understood that the inventions are not to be limited to the specific embodiments disclosed and that modifications and other embodiments are intended to be included within the scope of the appended claims.

FIG. 1 illustrates an example system 100 configured to implement an adaptive crowd-trained learning framework that includes a curated training data set which is adapted for accurate representation of dynamic data analysis. In embodiments, system 100 comprises a predictive model 120 (e.g., a classifier) that has been derived using supervised learning based on a set of training data 180, and that is configured to generate a judgment about the input data 105 in response to receiving a feature representation of the input data 105; an input data analysis component 110 for generating a feature representation of the input data 105; a quality assurance component 140 for assessment of the quality of the input data 105 and of the quality of the judgments of the predictive model 120; an active learning component 130 to facilitate the generation and maintenance of optimized training data 120; at least one oracle 150 for providing a true label for input data 105 that has been selected as a possible training example by the active learning component 130 and/or the quality assurance component 140; a labeled data reservoir 160 for storing the labeled input data 105 received from the oracle 150; and a training data manager 170 for curating the set of training data 180 by updating the set of training data 180 using a subset of the labeled input data instances stored in the labeled data reservoir 160.

In embodiments, the predictive model 120 may be derived through supervised learning based on an initial training data set 180 which, in some embodiments, has been generated automatically within the adaptive crowd-trained learning framework 100. In some embodiments, one or more high-quality initial training data sets may be generated automatically from a pool of unlabeled data instances. In some embodiments, the unlabeled data instances are dynamic data that have been collected from at least one data stream during at least one time window. In some embodiments, the collected data instances are multi-dimensional data, where each data instance is assumed to be described by a set of attributes (i.e., features hereinafter). In some embodiments, the sampled data instances are sent to an oracle 150 for labeling.

In embodiments, new unlabeled data instances 105, sharing the particular type of the examples in the training data set 180, are input to the system 100 for processing by the predictive model 120. For example, in some embodiments, each new data instance 105 may include multi-dimensional data collected from one or more online sources describing a particular business (e.g., a restaurant, a spa), and the predictive model 120 may be a classifier that returns a judgment as to which of a set of categories the business belongs.

In embodiments, the predictive model 120 generates a judgment (e.g., a predicted label identifying a category if the model is a classifier) in response to receiving a feature representation of an unlabeled input data instance 105. In some embodiments, the feature representation is generated during input data analysis 110 using a distribution-based feature analysis as described, for example, in U.S. patent application Ser. No. 14/038,661 entitled "Dynamic Clustering for Streaming Data," filed on Sep. 16, 2013, and which is incorporated herein in its entirety.

In some embodiments, the judgment generated by the predictive model 120 includes a confidence value. For example, in some embodiments in which the predictive model 120 is performing a classification task, the confidence value included with a classification judgment is a score representing the distance in decision space of the judgment from the task decision boundary. Classification judgments that are more certain are associated with higher confidence scores because those judgments are at greater distances in decision space from the task decision boundary.

In some embodiments, an input data instance 105 and its associated judgment may be selected as a possible training example by an active learning component 130. Active learning, as described, for example, in Settles, Burr (2009), "Active Learning Literature Survey", Computer Sciences Technical Report 1648, University of Wisconsin-Madison, is a semi-supervised learning process in which the distribution of training data set instances can be adjusted to optimally represent a machine learning problem. For example, a machine-learning algorithm may achieve greater accuracy with fewer training labels if the training data set instances are chosen to provide maximum information about the problem. Referring to a classification task example, input data instances that result in classifier judgments that are closer to the decision boundary (e.g., judgments that are associated with lower confidence values as previously described) are more likely to provide maximum information about the classification task and thus may be recognized by an active learning component 130 as possible training examples.

In some embodiments, an active learning component 130 may generate an accuracy assessment by calculating an accuracy assessment score combining model prediction accuracy and data quality. In some embodiments, an accuracy assessment may include identifying model prediction errors (e.g., a classifier model generates a predicted judgment with a high confidence value, but the judgment assigns the input data to the wrong category).

In some embodiments, selection of a possible training example may be implemented by a quality assurance component 140 that monitors the quality of the predictive model performance as well as the quality of the input data being processed. In some embodiments, monitoring quality may be based on at least in part on comparing a calculated quality score to an accuracy threshold representing the system's desired accuracy. In some embodiments, the calculated quality score may include an accuracy assessment calculated by an active learning component 130.

In embodiments, selected possible training examples are sent to an oracle 150 for verification, which includes the assignment of a true label to the input data instance. The resulting labeled input data 155 are stored in a labeled data reservoir 160. In some embodiments, the labeled data reservoir 160 grows continuously, and includes all possible training data samples that have been respectively selected by any one of multiple sources (e.g., the active learning component 130 and the quality assurance component 140 of system 100, one-off cleaning tasks, and/or external collections of verified labeled data) for different purposes. The choices of quantity and/or types of sources for possible training data samples are not critical to the invention.

In embodiments, the training data manager 170 may update the training data 180 by selecting, from a labeled data reservoir 160, an optimal subset of training data samples to use in a training data 180 update. In embodiments in which the input data instances are multi-dimensional data, the criteria used by the training data manager 170 for selecting the optimal subset of training data samples may be based at least in part on the feature analysis used to generate the initial training data set used to derive the model. In some embodiments, the feature analysis includes clustering collected unlabeled data instances into homogeneous groups across multiple dimensions using an unsupervised learning approach that is dependent on the distribution of the input data as described, for example, in U.S. patent application Ser. No. 14/038,661. In these embodiments, the criteria used by the training data manager 170 may be based on attributes of a single cluster over time to ensure maintenance of model fidelity over time and/or maintenance of an accurate class balance for classification tasks. In some embodiments, the training data manager 170 selection criteria may be used to update the feature extraction criteria implemented by the input data analysis component 110.

Figure 2:
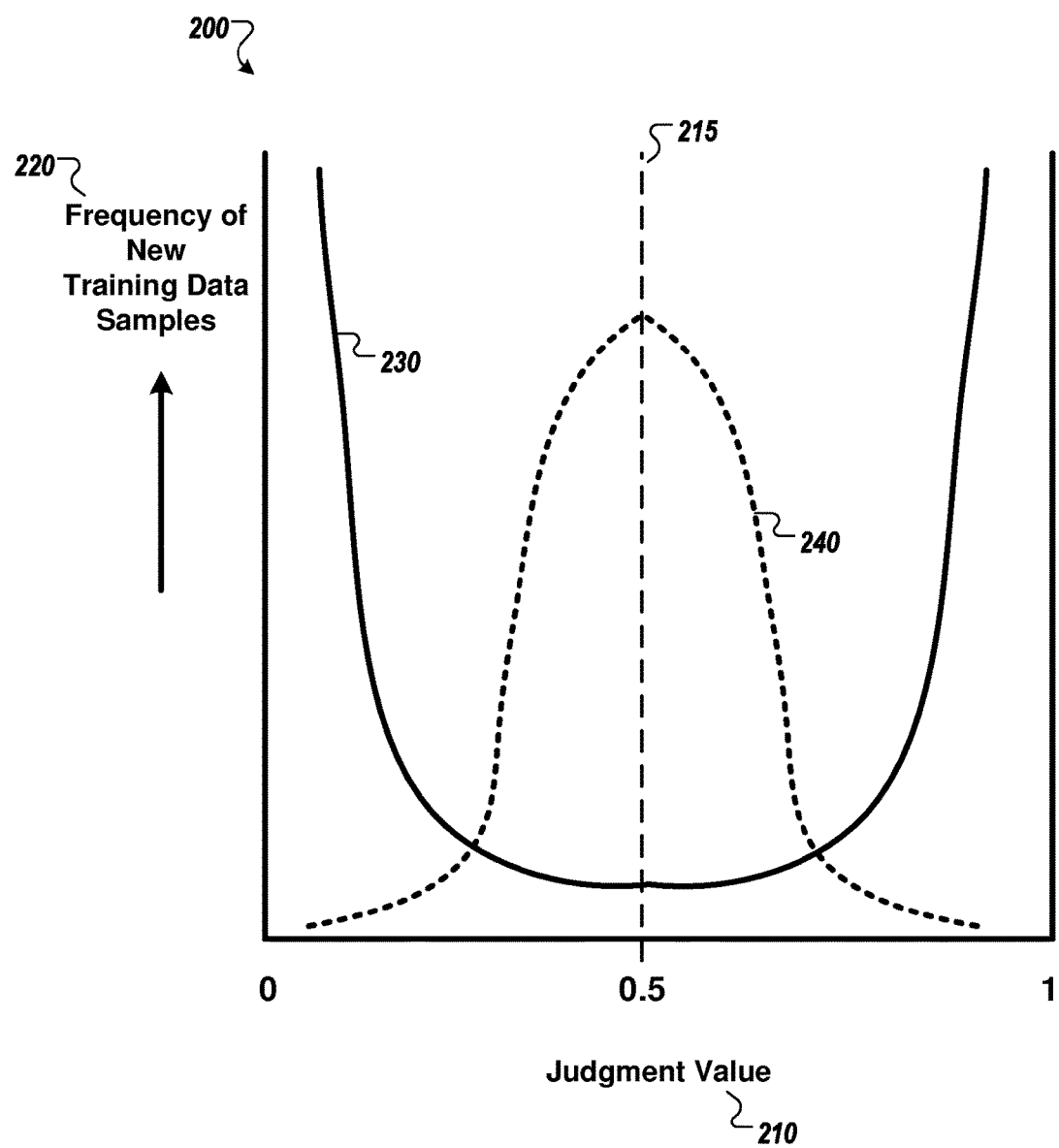
FIG. 2 is an illustration of an example of the different effects of updating an exemplary training data set for a binary classification task using labeled data samples that have been respectively chosen from either active learning or dynamic data quality assessment in accordance with some embodiments discussed herein.

FIG. 2 is an illustration 200 of an example of the different effects of updating an exemplary training data set for a binary classification task using labeled data samples that have been respectively chosen from either active learning or dynamic data quality assessment. A model (i.e., a binary classifier) assigns a predicted judgment value 210 to data sample; a data sample assigned a judgment value that is close to either 0 or 1 has been determined with certainty by the classifier to belong to one or the other of two classes. A judgment value of 0.5 represents a situation in which the classification decision was not certain (i.e., the predicted judgment is close to the decision boundary 215 for the classification task).

The dashed curve 240 represents the relative frequencies of new training data samples that would be added to a training data set for this binary classification problem by an active learning component. To enhance the performance of the classifier in situations where the decision was uncertain, the active learning component would choose the majority of new training data samples from input data that resulted in decisions near the decision boundary 215.

The solid curve 230 represents the relative frequencies of new training data samples that would be added to the training data set by dynamic quality assessment. Instead of choosing new training data samples based on the judgment value, in some embodiments, dynamic quality assessment may choose the majority of new training data samples based on whether they statistically belong in the data reservoir distribution. It also may select new training data samples that were classified with certainty (i.e., having a judgment value close to either 0 or 1), but erroneously (e.g., samples in which the predicted judgment from the classifier did not match the result returned from the oracle).

Figure 3:
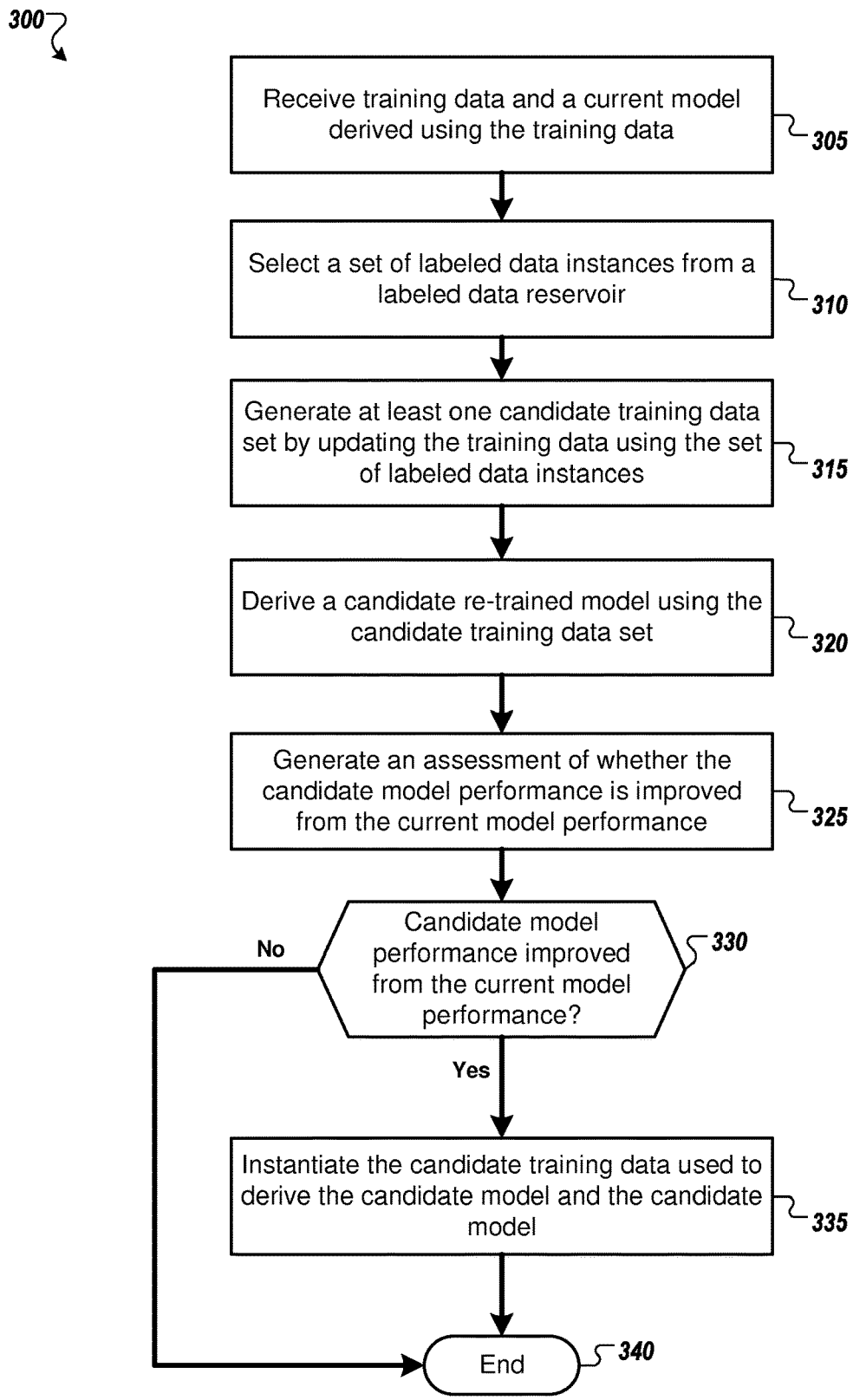
FIG. 3 is a flow diagram of an example method for automatic updating of a training data set based on incremental re-training of a predictive model in accordance with some embodiments discussed herein.

FIG. 3 is a flow diagram of an example method 300 for automatic updating of a training data set based on incremental re-training of a predictive model. For convenience, the method 300 will be described with respect to a system that includes one or more computing devices and performs the method 300. Specifically, the method will be described with respect to implementation by training data manager 170 within system 100.

In embodiments, after receiving 305 training data and a current model derived using the training data, the system selects 310 a set of labeled data instances from a labeled data reservoir. In some embodiments, the data in the labeled data reservoir are not included in the training data. As previously described, in some embodiments, a labeled data reservoir includes a pool of possible training data that have been collected continuously over time from input data being processed by the model. Each of the data instances in the reservoir has been assigned a true label (e.g., a verified category identifier for a classification task) by a trusted source (i.e., an oracle). In some embodiments, the labeled reservoir data have been collected as a result of having been selected, for different purposes, by one of multiple sources (e.g., the active learning component 130 and the quality assurance component 140 of system 100). For example, referring to the exemplary binary classification task 200, active learning may select possible training data instances from input data in which the predicted judgment is close to the decision boundary (thus providing maximum information about the task to the model), while dynamic quality assessment may select possible training data instances from input data based on a statistical decision.

In embodiments, selecting the set of labeled data instances from the labeled data reservoir is based on a determination that re-training the model with updated training data likely will result in improved model performance. In some embodiments, this determination is based at least in part on analyzing the distribution and quality of the training data. For example, in some embodiments in which the predictive model is a classifier, the selection may be based at least in part on maintenance and/or improvement of class balance in the training data (e.g., adding training examples of rare categories). In a second example, the selection may be based at least in part on adding examples having higher data quality than the training data. In a third example, the selection may be based at least in part on adding examples that have higher accuracy assessment scores, as previously described. Additionally and/or alternatively, in some embodiments in which curating training data is implemented within an adaptive dynamic data analysis system (e.g., system 100), this determination is based on feedback signals received from one or more components of the system (e.g., the active learning component 130 and the quality assurance component 140) and/or data freshness (i.e., adding more newer data to a training data set than older data).

In embodiments, the system generates 315 at least one candidate training data set by updating the training data using the set of labeled data instances. In embodiments, updating the training data may include pruning the training data set and replacing removed data with at least a subset of the selected labeled data. In some embodiments, pruning the training data set may include removing outliers from the training data. In some embodiments in which the model is a classifier, removing outliers may be implemented on a per class basis (e.g., removing a training data sample describing a patient who has been classified as having a particular disease but has attributes that are inconsistent with the attributes describing other patients who have been classified as having that disease). Additionally and/or alternatively, updating the training data may include pruning outliers from the selected labeled data before updating the training data.

In some embodiments, the system derives multiple candidate models by deriving each model using differently updated sets of the received training data. In some embodiments, each of the differently updated training data sets may represent the current training data having been updated using a different subset of the selected set of labeled data instances. In some embodiments, updating the current training data may be based on a greedy algorithm in which new batches of training data instances are added incrementally to the training data set. Before each batch is added, a test is performed to determine if updating the training data by adding the batch will improve the model performance. Additionally and/or alternatively, in some embodiments, updating the current training data may be based on a non-greedy algorithm in which, for example, all the current training data are removed and replaced with a completely new set of training data.

In embodiments, for each candidate updated training data set, the system derives 320 a candidate model using supervised learning. In embodiments, the system generates 325 an assessment of whether the candidate model performance is improved from the current model performance. In some embodiments, generating the assessment includes A/B testing in which the same set of data is input to the current model and to at least one candidate model that has been trained using candidate training data and then comparing the performance of the candidate model to the performance of the current model. In some embodiments, comparing the performance of the current model and a candidate model is implemented by cross-validation. There are a variety of well-known statistical techniques for comparing results; the choice of statistical technique for comparing the performance of models is not critical to the invention.

In some embodiments in which the model performs real time analysis of input data from a datastream (e.g., embodiments of dynamic data analysis system 100), the input datastream may be forked to multiple models so that A/B testing is implemented in parallel for all the models. In embodiments, the system updates 320 the training data and instantiates a re-trained model in an instance in which the assessment indicates that re-training the current model using the updated training data results in improved model performance.

In an instance in which the assessment indicates that a re-trained model performance is improved from the current model performance 330, the system instantiates 335 the candidate updated training data used to derive the candidate model and the candidate model before the process ends 340. In some embodiments in which the training data are not included in the labeled data reservoir, instantiating the updated training data includes removing the selected set of labeled data instances used to update the received training data from the labeled data reservoir.

The process ends 340 in an instance in which the assessment indicates that a candidate model performance is not improved from the current model performance 330.

Figure 4:
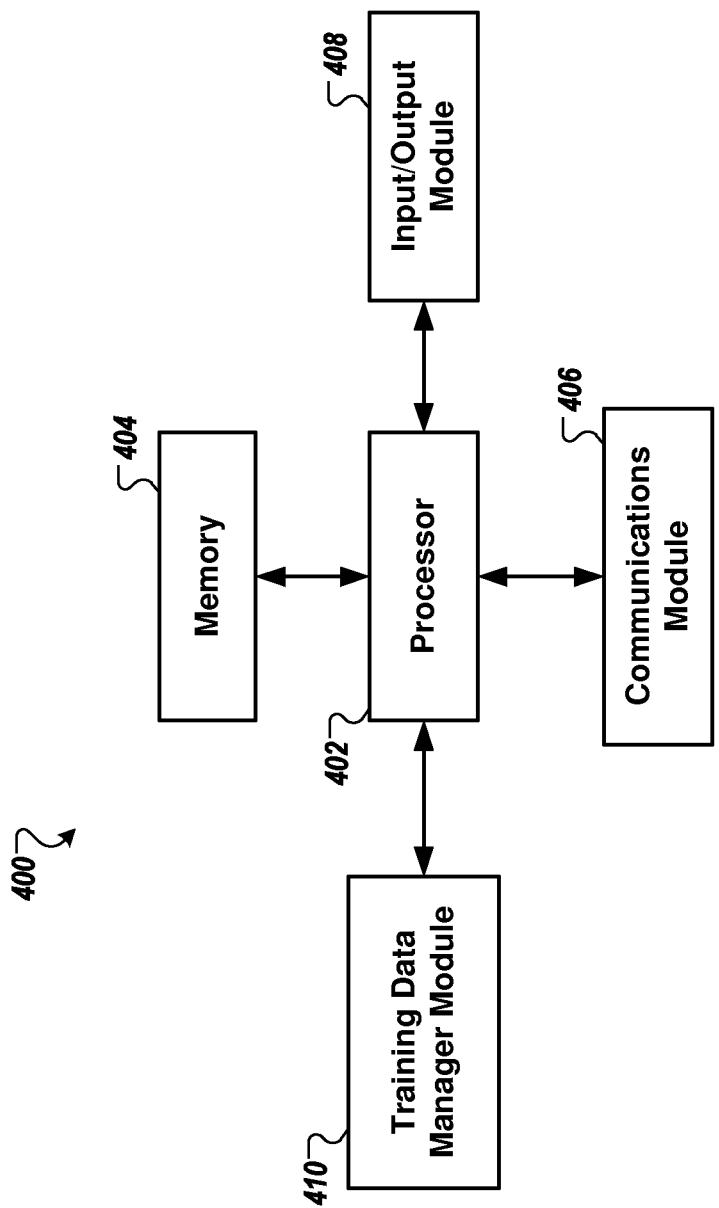
FIG. 4 illustrates a schematic block diagram of circuitry that can be included in a computing device, such as a training data manager module, in accordance with some embodiments discussed herein.

FIG. 4 shows a schematic block diagram of circuitry 400, some or all of which may be included in, for example, adaptive crowd-trained learning framework system 100. As illustrated in FIG. 4, in accordance with some example embodiments, circuitry 400 can include various means, such as processor 402, memory 404, communications module 406, and/or input/output module 408. As referred to herein, "module" includes hardware, software and/or firmware configured to perform one or more particular functions. In this regard, the means of circuitry 400 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments processor 402 comprises a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 402 is configured to execute instructions stored in memory 404 or otherwise accessible to processor 402. These instructions, when executed by processor 402, may cause circuitry 400 to perform one or more of the functionalities of circuitry 400 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. Alternatively, as another example, when processor 402 is embodied as an executor of instructions, such as may be stored in memory 404, the instructions may specifically configure processor 402 to perform one or more algorithms and operations described herein, such as those discussed in connection with FIG. 3.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 404 may be configured to store information, data (including analytics data), applications, instructions, or the like for enabling circuitry 400 to carry out various functions in accordance with example embodiments of the present invention. For example, in at least some embodiments, memory 404 is configured to buffer input data for processing by processor 402. Additionally or alternatively, in at least some embodiments, memory 404 is configured to store program instructions for execution by processor 402. Memory 404 may store information in the form of static and/or dynamic information. This stored information may be stored and/or used by circuitry 400 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second circuitry 400 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices. Communications module 406 may additionally or alternatively be in communication with the memory 404, input/output module 408 and/or any other component of circuitry 400, such as via a bus.

Input/output module 408 may be in communication with processor 402 to receive an indication of a user input and/or to provide an audible, visual, mechanical, or other output to a user. Some example visual outputs that may be provided to a user by circuitry 400 are discussed in connection with FIG. 1. As such, input/output module 408 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 400 is embodied as a server or database, aspects of input/output module 408 may be reduced as compared to embodiments where circuitry 400 is implemented as an end-user machine or other type of device designed for complex user interactions. In some embodiments (like other components discussed herein), input/output module 408 may even be eliminated from circuitry 400. Alternatively, such as in embodiments wherein circuitry 400 is embodied as a server or database, at least some aspects of input/output module 408 may be embodied on an apparatus used by a user that is in communication with circuitry 400. Input/output module 408 may be in communication with the memory 404, communications module 406, and/or any other component(s), such as via a bus. Although more than one input/output module and/or other component can be included in circuitry 400, only one is shown in FIG. 4 to avoid overcomplicating the drawing (like the other components discussed herein).

Training data manager module 410 may also or instead be included and configured to perform the functionality discussed herein related to the training data curation discussed above. In some embodiments, some or all of the functionality of training data curation may be performed by processor 402. In this regard, the example processes and algorithms discussed herein can be performed by at least one processor 402 and/or training data manager module 410. For example, non-transitory computer readable media can be configured to store firmware, one or more application programs, and/or other software, which include instructions and other computer-readable program code portions that can be executed to control each processor (e.g., processor 402 and/or training data manager module 410) of the components of system 100 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402 and/or training data manager module 410 discussed above with reference to FIG. 4, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 404) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for adaptively improving the performance of a current predictive model by curating training data used to derive the current predictive model, the method comprising:

receiving the training data and the current predictive model derived using the training data;

selecting a set of labeled data instances from a labeled data reservoir, wherein the labeled data reservoir includes a pool of possible training data, wherein the set of labeled data instances are not included in the training data, wherein each labeled data instance is associated with a true label representing the instance, and wherein selecting the set of labeled data instances is based on a determination that re-training the model with updated training data likely will result in improved model performance;

generating at least one candidate training data set by updating the training data using the set of labeled data instances;

deriving a candidate model using the candidate training data set;

generating, by a training data manager component, an assessment of whether the candidate model performance is improved from the current model performance; and instantiating the candidate training data set and the candidate model in an instance in which the candidate model performance is improved from the current model performance.

2. The method of claim 1, wherein the labeled data reservoir includes data that have been collected continuously over time from input data being processed by the current predictive model.

3. The method of claim 1, wherein the determination is based at least in part on analyzing the distribution and quality of the training data.

4. The method of claim 3, wherein the current model is a classifier predicting to which of a set of predictive categories an input data instance belongs, wherein a true label associated with a labeled data instance identifies the predictive category to which the labeled data instance belongs, and wherein selecting the set of labeled data instances from the labeled data reservoir is based at least in part on maintaining a class balance within the training data.

5. The method of claim 1, wherein generating the candidate training data comprises:
identifying and removing outlier instances.

6. The method of claim 5, wherein the current model is a classifier predicting to which of a set of predictive categories an input data instance belongs, and wherein selecting the set of labeled data instances from the labeled data reservoir comprises:
identifying and removing outlier instances in one predictive category.

7. The method of claim 1, wherein the labeled data reservoir includes labeled data instances that are received from multiple sources, and wherein selecting a labeled data instance from the set of labeled data instances comprises:
comparing a source of the labeled data instance with a pre-determined source; and
selecting the labeled data instance in an instance in which the source of the labeled data instance matches the pre-determined source.

8. The method of claim 1, wherein generating at least one candidate training data set is based on a greedy algorithm, the generating comprising:
generating a first candidate training data set by adding a first subset of the labeled data instances to the training data; and
generating a second candidate training data set by adding a second subset of the labeled data instances to the first candidate training data set.

9. The method of claim 1, wherein generating at least one candidate training data set is based on a non-greedy algorithm, the generating comprising:
replacing the training data with a subset of the labeled data instances.

10. The method of claim 1, wherein generating an assessment of whether the candidate model performance is improved from the current model performance includes A/B testing.

11. The method of claim 10, wherein generating the assessment comprises calculating a cross-validation between the candidate model performance and the current model performance.

12. The method of claim 10, wherein there are multiple candidate models, and wherein generating the assessment for each of the multiple candidate models is implemented in parallel.

13. A computer program product, stored on a non-transitory computer readable medium, comprising instructions that when executed on one or more computers cause the one or more computers to perform operations comprising:
receiving the training data and the current predictive model derived using the training data;
selecting a set of labeled data instances from a labeled data reservoir, wherein the labeled data reservoir includes a pool of possible training data, wherein the set of labeled data instances are not included in the training data, wherein each labeled data instance is associated with a true label representing the instance, and wherein selecting the set of labeled data instances is based on a determination that re-training the model with updated training data likely will result in improved model performance;
generating at least one candidate training data set by updating the training data using the set of labeled data instances;
deriving a candidate model using the candidate training data set;
generating, by a training data manager component, an assessment of whether the candidate model performance is improved from the current model performance; and
instantiating the candidate training data set and the candidate model in an instance in which the candidate model performance is improved from the current model performance.

14. The computer program product of claim 13, wherein the labeled data reservoir includes data that have been collected continuously over time from input data being processed by the current predictive model.

15. The computer program product of claim 13, wherein the determination is based at least in part on analyzing the distribution and quality of the training data.

16. The computer program product of claim 15, wherein the current model is a classifier predicting to which of a set of predictive categories an input data instance belongs, wherein a true label associated with a labeled data instance identifies the predictive category to which the labeled data instance belongs, and wherein selecting the set of labeled data instances from the labeled data reservoir is based at least in part on maintaining a class balance within the training data.

17. The computer program product of claim 13, wherein generating the candidate training data comprises:
identifying and removing outlier instances.

18. The computer program product of claim 17, wherein the current model is a classifier predicting to which of a set of predictive categories an input data instance belongs, and wherein selecting the set of labeled data instances from the labeled data reservoir comprises:
identifying and removing outlier instances in one predictive category.

19. The computer program product of claim 13, wherein the labeled data reservoir includes labeled data instances that are received from multiple sources, and wherein selecting a labeled data instance from the set of labeled data instances comprises:
comparing a source of the labeled data instance with a pre-determined source; and selecting the labeled data instance in an instance in which the source of the labeled data instance matches the pre-determined source.

20. The computer program product of claim 13, wherein generating at least one candidate training data set is based on a greedy algorithm, the generating comprising:
   generating a first candidate training data set by adding a first subset of the labeled data instances to the training data; and
   generating a second candidate training data set by adding a second subset of the labeled data instances to the first candidate training data set.

21. The computer program product of claim 13, wherein generating at least one candidate training data set is based on a non-greedy algorithm, the generating comprising:
   replacing the training data with a subset of the labeled data instances.

22. The computer program product of claim 13, wherein generating an assessment of whether the candidate model performance is improved from the current model performance includes A/B testing.

23. The computer program product of claim 22, wherein generating the assessment comprises calculating a cross-validation between the candidate model performance and the current model performance.

24. The computer program product of claim 22, wherein there are multiple candidate models, and wherein generating the assessment for each of the multiple candidate models is implemented in parallel.

25. A system, comprising:
   one or more computers and one or more storage devices storing instructions that are operable, when executed by the one or more computers, to cause the one or more computers to perform operations comprising:
   receiving the training data and the current predictive model derived using the training data;
   selecting a set of labeled data instances from a labeled data reservoir, wherein the labeled data reservoir includes a pool of possible training data, wherein the set of labeled data instances are not included in the training data, wherein each labeled data instance is associated with a true label representing the instance, and wherein selecting the set of labeled data instances is based on a determination that re-training the model with updated training data likely will result in improved model performance;
   generating at least one candidate training data set by updating the training data using the set of labeled data instances;
   deriving a candidate model using the candidate training data set;
   generating, by a training data manager component, an assessment of whether the candidate model performance is improved from the current model performance; and
   instantiating the candidate training data set and the candidate model in an instance in which the candidate model performance is improved from the current model performance.

26. The system of claim 25, wherein the labeled data reservoir includes data that have been collected continuously over time from input data being processed by the current predictive model.

27. The system of claim 25 wherein the determination is based at least in part on analyzing the distribution and quality of the training data.

28. The system of claim 27, wherein the current model is a classifier predicting to which of a set of predictive categories an input data instance belongs, wherein a true label associated with a labeled data instance identifies the predictive category to which the labeled data instance belongs, and wherein selecting the set of labeled data instances from the labeled data reservoir is based at least in part on maintaining a class balance within the training data.

29. The system of claim 25, wherein generating the candidate training data comprises:
   identifying and removing outlier instances.

30. The system of claim 29, wherein the current model is a classifier predicting to which of a set of predictive categories an input data instance belongs, and wherein selecting the set of labeled data instances from the labeled data reservoir comprises:
   identifying and removing outlier instances in one predictive category.

31. The system of claim 25, wherein the labeled data reservoir includes labeled data instances that are received from multiple sources, and wherein selecting a labeled data instance from the set of labeled data instances comprises:
   comparing a source of the labeled data instance with a pre-determined source; and
   selecting the labeled data instance in an instance in which the source of the labeled data instance matches the pre-determined source.

32. The system of claim 25, wherein generating at least one candidate training data set is based on a greedy algorithm, the generating comprising:
   generating a first candidate training data set by adding a first subset of the labeled data instances to the training data; and
   generating a second candidate training data set by adding a second subset of the labeled data instances to the first candidate training data set.

33. The system of claim 25, wherein generating at least one candidate training data set is based on a non-greedy algorithm, the generating comprising:
   replacing the training data with a subset of the labeled data instances.

34. The system of claim 25, wherein generating an assessment of whether the candidate model performance is improved from the current model performance includes A/B testing.

35. The system of claim 34, wherein generating the assessment comprises calculating a cross-validation between the candidate model performance and the current model performance.

36. The system of claim 34, wherein there are multiple candidate models, and wherein generating the assessment for each of the multiple candidate models is implemented in parallel.

* * * * *